United States Patent [19]
Takakura

[11] Patent Number: 6,153,998
[45] Date of Patent: Nov. 28, 2000

[54] METHOD OF CONTROLLING A TWO-DEGREE-OF-FREEDOM CONTROL SYSTEM

[75] Inventor: Shinji Takakura, Kanagawa-ken, Japan

[73] Assignee: Kabushiki Kaisha Toshiba, Kawasaki, Japan

[21] Appl. No.: 09/321,118

[22] Filed: May 27, 1999

[30] Foreign Application Priority Data

May 28, 1998 [JP] Japan ................................. 10-147979

[51] Int. Cl.⁷ .............................. H02P 7/00; G05B 13/00
[52] U.S. Cl. ......................... 318/560; 318/561; 318/609; 318/610; 364/162; 364/163; 360/73.03
[58] Field of Search .................................. 318/560–696; 360/48–79; 369/44.34; 364/162, 163, 178, 179; 375/350, 233

[56] References Cited

U.S. PATENT DOCUMENTS

| | | | |
|---|---|---|---|
| 3,638,007 | 1/1972 | Brooks ..................... | 235/184 |
| 4,024,540 | 5/1977 | Ofverberg ................. | 343/14 |
| 4,136,287 | 1/1979 | Kephart et al. ........... | 307/221 |
| 5,202,821 | 4/1993 | Bauck et al. ............. | 364/162 |
| 5,365,385 | 11/1994 | Hargarten et al. ......... | 360/79.03 |
| 5,414,733 | 5/1995 | Turner .................... | 375/233 |
| 5,532,926 | 7/1996 | Dunn et al. .............. | 364/178 |
| 5,561,687 | 10/1996 | Turner .................... | 375/233 |
| 5,592,517 | 1/1997 | Camp et al. .............. | 375/350 |
| 5,699,045 | 12/1997 | Frederick et al. ......... | 340/551 |
| 5,757,568 | 5/1998 | Greenberg et al. ......... | 360/49 |
| 5,764,017 | 6/1998 | Bauck ..................... | 318/610 |
| 5,936,790 | 8/1999 | Ho et al. ................. | 360/77.05 |
| 6,018,430 | 1/2000 | Ho et al. ................. | 360/48 |

FOREIGN PATENT DOCUMENTS

| | | |
|---|---|---|
| 7-29335 | 1/1995 | Japan . |
| 9-139032 | 5/1997 | Japan . |

OTHER PUBLICATIONS

Hiroshi Fujimoto, et al. "New Digital Redesign Method in Use of N–Delay Control", The Transactions of the Institute of Electrical Engineers of Japan, vol. 117–D, No. 5, 1997, pp. 645–654.

*Primary Examiner*—Paul Ip
*Attorney, Agent, or Firm*—Oblon, Spivak, McClelland, Maier & Neustadt, P.C.

[57] ABSTRACT

There is provided a method of controlling a two-degree-of-freedom control system for controlling a controlled object. The method includes the steps of generating a first signal for feedforward control using a target value and generating a second signal for feedback control using an output signal from the controlled object. The method further includes the steps of outputting a plurality of the first signals while the second signal is outputted once, and controlling the controlled object by using the first signal and the second signal. In the present invention, plurality of the first signals include signals with different time widths.

9 Claims, 15 Drawing Sheets

METHOD OF CONTROLLING A TWO-DEGREE-OF-FREEDOM CONTROL SYSTEM

BACKGROUND

1. Field of the Invention

This invention relates a method of controlling a two-degree-of-freedom control system, and more particularly to a method of controlling a two-degree-of-freedom control system that controls a VCM (voice coil motor) of a magnetic disk apparatus.

2. Description of the Related Art

A two-degree-of-freedom control system is generally carried out in order to constitute a tracking system in a mechanical system and the like. For example, as shown in FIG. 1, the two-degree-of-freedom control system 107 includes an actuator 100 as a controlled object, a feedback controller 101, a feedforward controller 102 for generating a control signal 105 given to the actuator 100, and a feedforward controller 103 for generating a reference signal 106 by a step-formed target value 108 given to a feedback loop. Recently, because the two-degree-of-freedom control system is usually constituted by a digital control system equipped with a micro-computer, the feedforward controller 102, the feedforward controller 103, the feedback controller 101 etc. can mathematically be parts of the micro-computer and the outputs thereof are calculated by the micro-computer. The control command generated from the outputs are given to the driver of the actuator 100 through a D/A converter.

In the two-degree-of-freedom control system 107 as shown in FIG. 1, the actuator 100 is driven by the control signal 105 from the feedforward controller 102, and the difference between a measured position signal from the actuator 100 and the reference signal 106 from the feedforward controller 103 is calculated and applied to the feedback controller 101. The outputs from the feedback controller 101 and the feedforward controller 102 are then entered to a zero order holder. It should be understood from the above explanation that the frequency components of the control signal 105 from the feedforward controller 102 should not excite (or generate) a resonance mode such as a high order resonance mode. Further, the control signal including less frequency components in a condition of the high order resonance mode is necessary for the actuator 100 from the feedforward controller 102.

In order to realize the tracking system with high speed in such a system, the frequency characteristic of the actuator 100 as the controlled object becomes important. If an actuator with better characteristics and a frequency band much higher than the control band required for the high order resonance mode exists, it is not difficult to design a tracking system with high speed by using the digital control system. However, in order to realize the two-degree-of-freedom control system with high performance, the control band should be set as high as possible.

It is unknown, without changing mechanical design, to set the high order resonance mode of the actuator as the controlled object to a frequency band higher than the control band, and the high order resonance mode of the actuator tends to be in the frequency band close to the required control band. If the tracking control with high speed is realized, a control system designed by taking account of the influence of the high order resonance mode of the actuator is required. In the case where the sampling frequency of the digital control system is high enough and the frequency of the high order resonance mode is lower than Nyquist frequency, it is possible to design the control system, in the designing of the feedback controller and the feedforward controller, by taking the influence of the high order resonance mode using $H \infty$ control theory into consideration.

However, if such a mechanical system in which the sampling frequency of the digital control system cannot be made high enough due to the restraint of the system and the frequency of the high order resonance mode is higher than the Nyquist frequency, it is difficult to take the high order resonance mode of the actuator into consideration when designing the control system. Therefore, it is difficult to realize the tracking control.

As described above, in the conventional method of controlling the two-degree-of-freedom control system, the high order resonance mode of the actuator as the controlled object exists in a frequency band that is higher than the Nyquist frequency. Therefore, if the high order resonance mode tends to be close to the control band, it is difficult to realize the tracking control with high speed, and in the worst case, vibration occurs between sampling points.

SUMMARY OF THE INVENTION

The present invention has been made in view of the above-mentioned circumstances and is intended to solve the above-mentioned problems. In particular, one object of the present invention is to provide a method of controlling a two-degree-of-freedom control system which realizes high-speed tracking control, in which the high order resonance mode of the actuator having a frequency band higher than the Nyquist frequency is not excited (or generated).

Additional purposes and advantages of the invention will be apparent to persons skilled in this field from the following description, or may be learned by practice of the invention.

The present invention provides a method of controlling a two-degree-of-freedom control system for controlling a controlled object, including the steps of: generating a first signal for feedforward control using a target value; generating a second signal for feedback control using an output signal from the controlled object; outputting a plurality of the first signals while the second signal is outputted once, wherein the plurality of the first signals include signals with different time widths; and controlling the controlled object using the first signals and the second signal.

The method may further includes a step of setting a frequency component of the first signal to be reduced, unless the frequency component corresponds to integer-fold of Nyquist frequency of the second signal. The first signal and the second signal may be digital signals.

The present invention also provides a two-degree-of-freedom control system capable of controlling a controlled object, including a first control system that generates a first signal for feedforward control using a target value; a second control system that generates a second signal for feedback control using an output signal from the controlled object, the controlled object being controlled using the first signal and the second signal; and a controller that outputs a plurality of the first signals while the second signal is outputted once, wherein the plurality of the first signals include signals with different time widths.

The present invention further provides a method of controlling a magnetic disk drive apparatus for controlling an actuator for positioning a magnetic head, including the steps of generating a first signal for feedforward control of the actuator using a target value for the actuator; generating a second signal for feedback control of the actuator using an output signal from the actuator; outputting a plurality of the first signals while the second signal is outputted once, wherein the plurality of the first signals include signals with different time widths; and controlling the actuator using the first signal and the second signal.

The present invention further provides a magnetic disk drive apparatus capable of controlling an actuator for positioning a magnetic head, including a first control system that generates a first signal for feedforward control of the actuator using a target value for the actuator; a second control system that generates a second signal for feedback control of the actuator using an output signal from the actuator, the actuator being controlled using the first signal and the second signal; and a controller that outputs a plurality of the first signals while the second signal is outputted once, wherein the plurality of the first signals include signals with different time widths.

BRIEF DESCRIPTION OF DRAWINGS

The accompanying drawings, which are incorporated in and constitute a part of this specification, illustrate several preferred embodiments of the invention and, together with the description, serve to explain the principles of the invention.

DESCRIPTION OF PREFERRED EMBODIMENTS

Preferred embodiments of a method of controlling a two-degree-of-freedom control system of the present invention will now be specifically described in more detail with reference to the accompanying drawings. Wherever possible, the same reference numbers will be used throughout the drawings to refer to the same or like parts.

Figure 1:
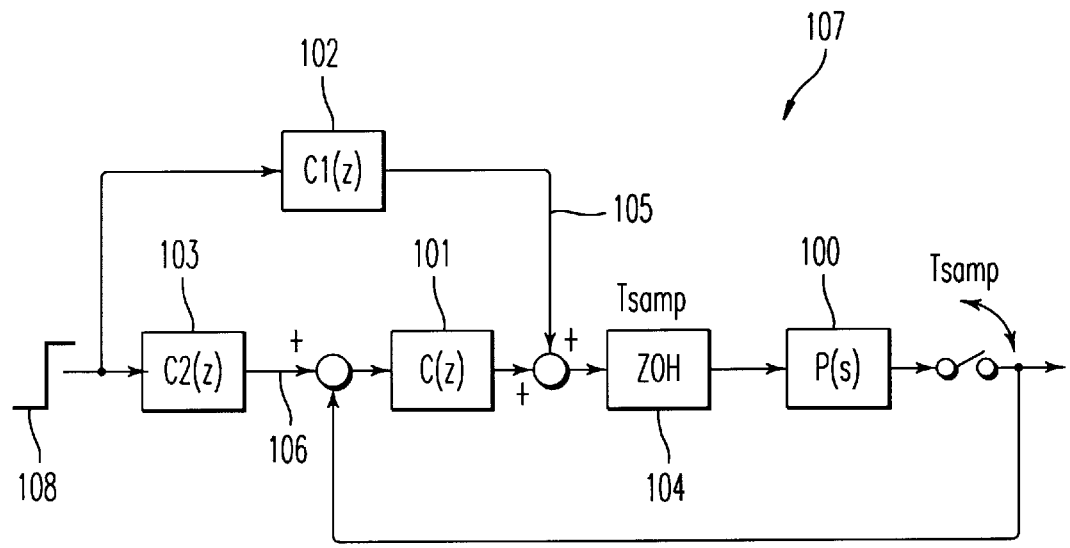
FIG. 1 is a block diagram showing a control system used for a conventional two-degree-of-freedom control system.

In the conventional method of controlling a two-degree-of-freedom control system 107 in FIG. 1, the actuator 100 is driven by the control signal 105 from the feedforward controller 102, and the difference between the position signal of the actuator 100 and the reference signal 106 from the feedforward controller 103 is calculated and applied to the feedback controller 101. The frequency components of the control signal 105 from feedforward controller 102 should not excite (or generate) a high order resonance mode, and giving the control signal having less frequency components in the high order resonance mode from the feedforward controller 102 to the actuator 100 is necessary.

Therefore, it is important to focus on the design of the feedforward controller 102 which generates the control signal 105 from the target value 108. In the conventional two-degree-of-freedom control system as shown in FIG. 1, the feedback controller 101, the feedforward controller 102, and the feedforward controller 103 are controlled by a microprocessor so as to calculate the outputs in the same sampling period $T_{samp}$, which is the same as the sampling period of the feedback control system, and the output from the microprocessor is then entered to the zero order holder 104 for D/A conversion which operates to be synchronized with the sampling period $T_{samp}$. Although the reference signal that is output from the feedforward controller 103 is required to be in the same sampling period $T_{samp}$ as of the feedback control system, the sampling period of the feedforward controller 102 is independent of the $T_{samp}$ of the feedback control system because the feedforward controller 102 does not require measured position information from the actuator 100.

Figure 2:
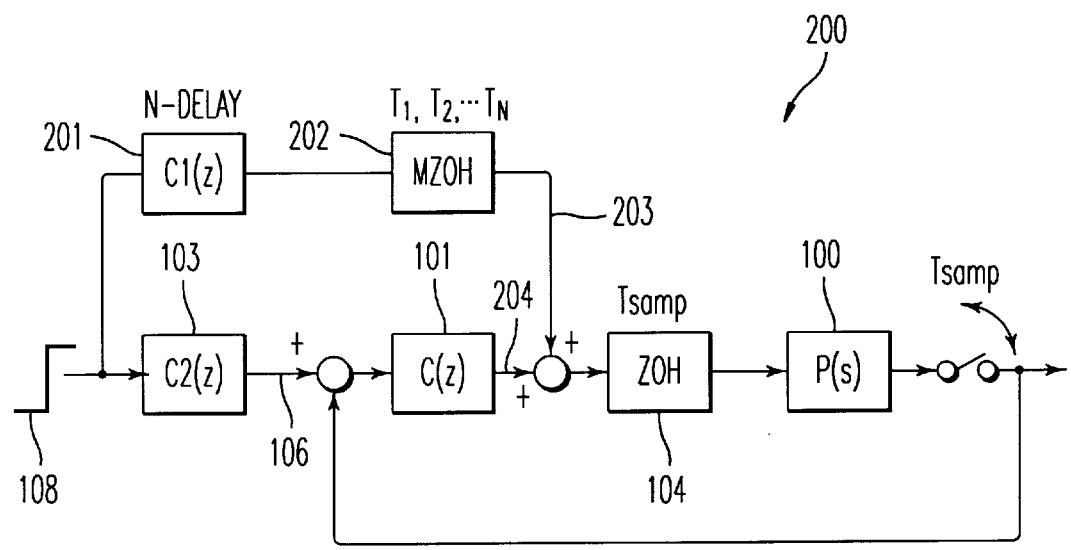
FIG. 2 is a block diagram showing a first embodiment of a method of two-degree-of-freedom control system of the present invention.

Therefore, the two-degree-of-freedom control system in the present invention is equipped with multi-sampling function in the system. FIG. 2 is a block diagram showing a first embodiment of the present invention. This embodiment shows the two-degree-of-freedom control system 200 having a feedforward controller 201 and a multi zero order holder 202.

Because the feedforward controller 201 is designed by N-Delay control theory and outputs N times in the sampling period $T_{samp}$ of the zero order holder 104, a control signal (first signal) 203 includes less frequency components in the high order resonance mode. In the present invention, a feedforward controller in the continuous system, which has better performance against the nominal model of the actuator in the continuous system, is derived and the derived feedforward controller is further de-designed by taking account of the N-Delay control theory that provides outputs N times in the sampling period $T_{samp}$.

In the feedforward system in this two-degree-of-freedom control system 200, the multi zero order holder 202 capable of storing outputs from the feedforward controller 201 for N times in the sampling period $T_{samp}$. A plurality of outputs from the feedforward system are held in the single sampling period $T_{samp}$ of an output (second signal) 204 of the feedback system.

Figure 4:
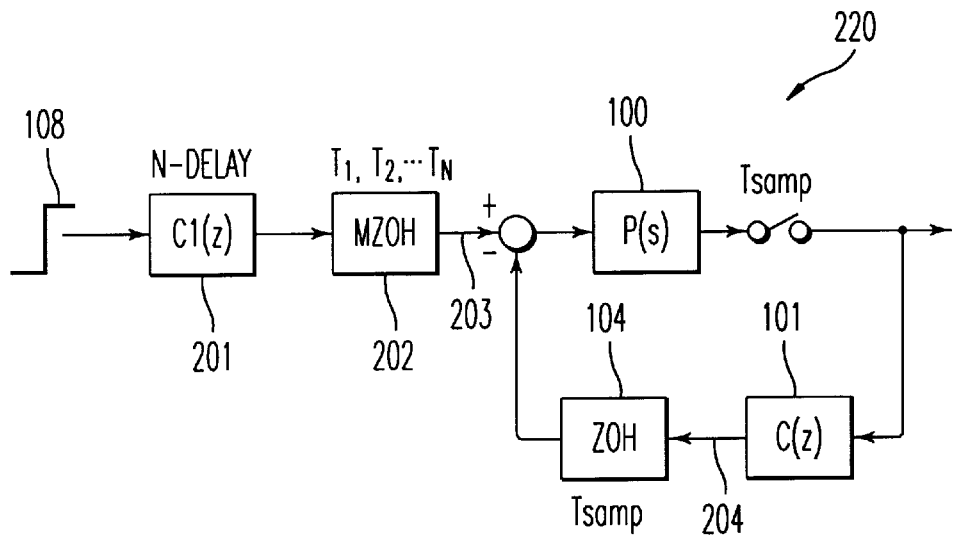
FIG. 4 is a block diagram showing a third embodiment of the method of two-degree-of-freedom control system of the present invention.
Figure 3:
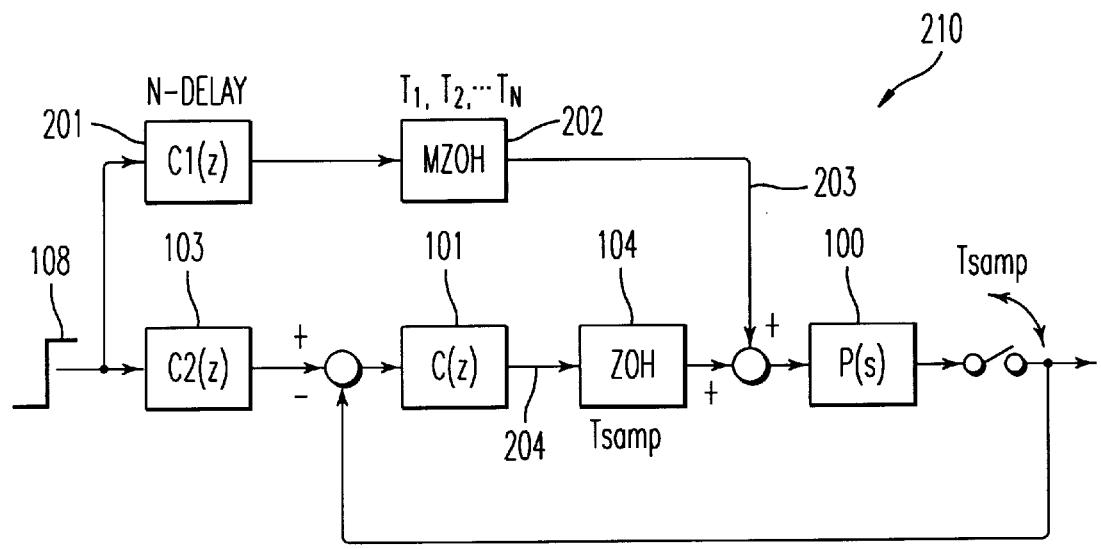
FIG. 3 is a block diagram showing a second embodiment of the method of two-degree-of-freedom control system of the present invention.

FIGS. 3 and 4 are block diagrams showing second and third embodiments of the present invention. These embodiments show the two-degree-of-freedom control systems 210 and 220 each having a feedforward controller 201 and a multi zero order holder 202. The object of the present invention is also achieved by applying these embodiments to the system.

Figure 5:
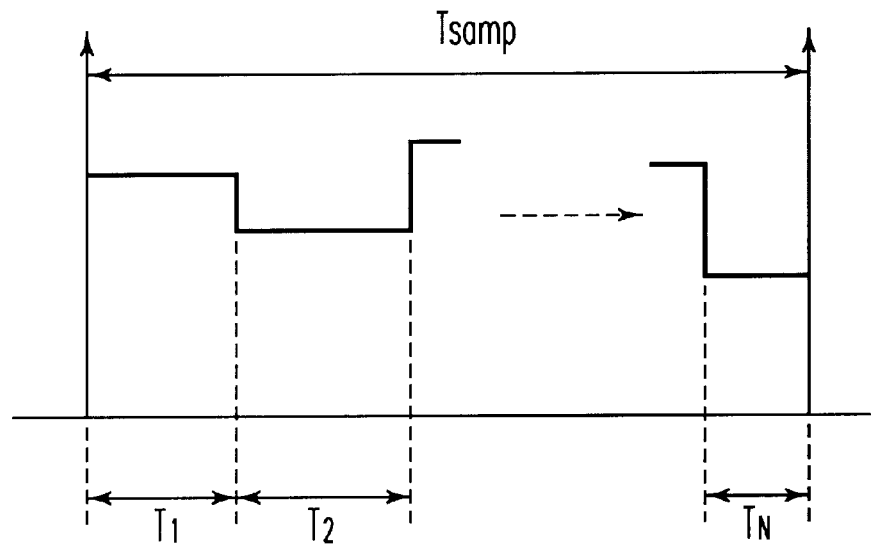
FIG. 5 is a timing chart showing one example of time allocation in a sampling period $T_{samp}$ of an N-Delay control system of the present invention.

As stated above, the control signal 203 from the feedforward controller 201 excludes the specific frequency components, by means of determining time allocation which is output in the sampling period $T_{samp}$ of the feedforward system such as shown in FIG. 5. That is, the sampling period $T_{samp}$ includes a plurality of signals with different time width. The method of designing thereof is explained below.

Equation (1) denotes the nominal model (1 input, 1 output and $n_p$ orders) of the actuator 100 in the continuous system, and equation (2) denotes the feedforward controller 201 in the continuous system (1 input and 1 output) which generates the control signal 203 from the target value 108.

$$\begin{cases} \dot{x}_p = A_p x_p + B_p u_{FF} \\ y_p = C_p x_p \end{cases} \quad (1)$$

$$\begin{cases} \dot{x}_{FF} = A_{FF} x_{FF} + B_{FF} R \\ u_{FF} = C_{FF} x_{FF} + d_{FF} R \end{cases} \quad (2)$$

Here, "x" and "y" indicate positions of the controlled object, "r" is the target position, "u" is the control signal, suffix "p" indicates the nominal model, suffix "FF" indicates the feedforward controller and "A", "B", "C" and "d" are matrixes.

The result of series connection of equations (1) and (2) is expressed in equation (3), and the result of digitizing under the condition of zero-order-hold of equation (3) in the sampling period $T_{samp}$ is expressed in equation (4).

$$\begin{cases} \begin{bmatrix} \dot{x}_p \\ \dot{x}_{FF} \end{bmatrix} = \begin{bmatrix} A_p & B_p C_{FF} \\ 0 & A_{FF} \end{bmatrix} \begin{bmatrix} x_p \\ x_{FF} \end{bmatrix} + \begin{bmatrix} B_p d_{FF} \\ B_{FF} \end{bmatrix} R \\ y_p = [C_p \quad 0] \begin{bmatrix} x_p \\ x_{FF} \end{bmatrix} \end{cases} \quad (3)$$

$$\begin{cases} \begin{bmatrix} x_{pz}(k+1) \\ x_{FFz}(k+1) \end{bmatrix} = \begin{bmatrix} e^{A_p T_{samp}} & A_{12z} \\ 0 & e^{A_{FF} T_{samp}} \end{bmatrix} \begin{bmatrix} x_{pz}(k) \\ x_{FFz}(k) A_{FF} \end{bmatrix} + \begin{bmatrix} B_{11z} \\ B_{21z} \end{bmatrix} R \\ y_{pz}(k) = [C_p \quad 0] \begin{bmatrix} x_{pz}(k) \\ x_{FFz}(k) \end{bmatrix} \end{cases} \quad (4)$$

Next, assumed that $u_{ff}$ changes N times in the sampling period $T_{samp}$ as shown in FIG. 5, the nominal model of the actuator 100 in the continuous system is calculated and is discreted as expressed in equation (5).

$$\begin{cases} x_{pz}(k+1) = e^{A_p T_{samp}} x_{pz}(k) + [H_1 \ldots H_N] \begin{bmatrix} u_{FFz1} \\ \vdots \\ u_{FFzN} \end{bmatrix} \\ y_{pz}(k) = C_p x_{pz}(k) \end{cases} \quad (5)$$

Here, symbols $H_1$ to $H_N$ mean a matrix, consisting of one column and $n_p$ rows, expressed by equation (6) that is determined by the time widths of outputs of $U_{FFz1}$ to $U_{FFzN}$. Namely, H is a matrix with N columns and $n_p$ rows.

$$H_1 = \int_{T_{samp}-T_1}^{T_{samp}} e^{A_p \tau} d\tau \cdot B_p, \quad (6)$$

$$H_2 = \int_{T_{samp}-T_1-T_2}^{T_{samp}-T_1} e^{A_p \tau} d\tau \cdot B_p, \ldots,$$

$$H_N = \int_0^{T_{samp}-T_1-\cdots-T_N} e^{A_p \tau} d\tau \cdot B_p$$

Next, assumed that the required feedforward controller 201 with the N-Delay control theory is expressed in equation (7). From equation (7), the variables to be required are $B_{FFz}$, $C_{FFz}$ and $D_{FFz}$.

$$\begin{cases} x_{FFz}(k+1) = e^{A_{FF} T_{samp}} x_{FFz}(k) + B_{FFz} R(k) \\ \begin{bmatrix} u_{FFz1} \\ \vdots \\ u_{FFzN} \end{bmatrix} = C_{FFz} x_{FFz}(k) + D_{FFz} R(k) \end{cases} \quad (7)$$

The result of series connection of equations (5) and (7) is expressed in equation (8).

$$\begin{cases} \begin{bmatrix} x_{pz}(k+1) \\ x_{FFz}(k+1) \end{bmatrix} = \begin{bmatrix} e^{A_p T_{samp}} & H C_{FFz} \\ 0 & e^{A_{FF} T_{samp}} \end{bmatrix} \begin{bmatrix} x_{pz}(k) \\ x_{FFz}(k) \end{bmatrix} + \begin{bmatrix} H D_{FFz} \\ B_{FFz} \end{bmatrix} R \\ y_{pz}(k) = [C_p \quad 0] \begin{bmatrix} x_{pz}(k) \\ x_{FFz}(k) \end{bmatrix} \end{cases} \quad (8)$$

It is understood that equations (9), (10) and (11) must be achieved in order that the responses on a sampling point in equations (4) and (8) correspond to each other.

$$HC_{FFz} = A_{12z} \quad (9)$$

$$HD_{FFz} = B_{11z} \quad (10)$$

$$B_{FFz} = B_{21z} \quad (11)$$

The solutions of equations (9) and (10) are expressed as equation (12), by assuming the generalized inverse matrix of H to be H⁻.

$$C_{FFz} = H^- A_{12z}, \quad D_{FFz} = H^- B_{11z} \quad (12)$$

If the number of outputs in the sampling period $T_{samp}$ is set to $n_p$, then $N=n_p$, and H can be a square matrix. The solution of equations (9) and (10) is expressed by equation (13) if there exist an inverse matrix $H^{-1}$.

$$C_{FFz} = H^{-1} A_{12z}, \quad D_{FFz} = H^{-1} B_{11z} \quad (13)$$

In order to realize the generalized inverse matrix H⁻ and the inverse matrix $H^{-1}$, the condition as stated below must be achieved. It is known that such condition can be achieved if N, which is the number of changes in the sampling period $T_{samp}$, is more than $n_p$, which is the degree of the actuator.

$$\text{rank } H = n_p$$

The N-Delay discrete feedforward controller 201 can be designed. The nominal model including the control current and the position information of the actuator 100 is generally expressed in quadratic form, and by using equation (13), the response on the sampling point can be corresponded to the response of the continuous system under the condition of N=2. Further, in the case of N>2, the response on the sampling point can also be corresponded to the response of the continuous system by using equation (12). Thus, the flexibility of the variety of the time allocation of the control signal between $u_{FFz1}$ to $U_{FFzN}$ in a sampling point can be increased. That is, by corresponding the response on the sampling point of the nominal model of the actuator 100 with the response of the continuous system, and by varying the number of time change and the time allocation in the sampling period $T_{samp}$, the frequency components in the control signal from the feedforward controller 201 can be adjusted.

The aforementioned frequency components in the control signal 203 from the N-Delay discrete feedforward controller 201 are then calculated. The control signal 203 from the N-Delay discrete feedforward controller 201 under time range is expressed in equation (14).

$$u_{FFz}(t) = \sum_{n=0}^{n} \left\{ y_1(n \cdot T_{samp}) \cdot P_{\frac{T_1}{2}}\left[t - \frac{T_1}{2} - n \cdot T_{samp}\right] + \right.$$

$$y_2(n \cdot T_{samp}) \cdot P_{\frac{T_2}{2}}\left[t - T_1 - \frac{T_2}{2} - n \cdot T_{samp}\right] + \cdots +$$

$$\left. y_N(n \cdot T_{samp}) \cdot P_{\frac{T_N}{2}}\left[t - T_1 - T_2 - \cdots - T_{N-1} - \frac{T_N}{2} - n \cdot T_{samp}\right] \right\} \quad (14)$$

Figure 6:
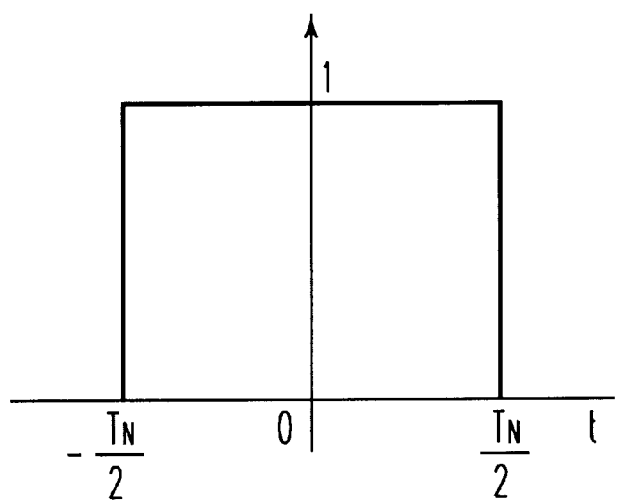
FIG. 6 is a diagram showing one example of a function with parameter TN in a feedforward control system of the present invention.

Here, these parameters are expressed as the functions shown in FIG. 6.

$$P_{\frac{T_1}{2}} \sim P_{\frac{T_N}{2}}$$

Concerning the time allocations $T_1$ to $T_N$, the relation as expressed below is required.

$$T_1 + T_2 + \ldots + T_N = T_{samp}, \quad T_1 > 0, T_2 > 0, \ldots T_N > 0 \quad (15)$$

If Fourier conversion is applied to equation (14), the frequency spectrum $U_{FFz}(J\omega)$ of the control signal 203 is expressed below.

$$U_{FFz}(j\omega) = \frac{2 \cdot \sin\left(\omega \cdot \frac{T_1}{2}\right)}{\omega} \cdot e^{-j\omega \frac{T_1}{2}} \cdot \sum_{n=0}^{\infty} y_1(n \cdot T_{samp}) +$$

$$\frac{2 \cdot \sin\left(\omega \cdot \frac{T_2}{2}\right)}{\omega} \cdot e^{-j\omega \frac{T_2}{2}} \cdot \sum_{n=0}^{\infty} y_2(n \cdot T_{samp}) +$$

$$\cdots + \frac{2 \cdot \sin\left(\omega \cdot \frac{T_N}{2}\right)}{\omega} \cdot e^{-j\omega \frac{T_N}{2}} \cdot \sum_{n=0}^{\infty} y_N(n \cdot T_{samp}) \quad (16)$$

From equation (16), the frequency components of the N-Delay discrete feedforward controller in the frequency of co can be calculated. By using this equation (16), the time allocations $T_1$ to $T_N$ capable of reducing the frequency components of the control signal 203 in the required frequency can be determined. Here, an evaluation function J as expressed below can be considered while calculating the time allocations $T_1$ to $T_N$.

$$J = \sum_{q=0}^{r} \{U_{FFz}(\omega_q) \cdot U_{FFz}^*(\omega_q)\} \quad (17)$$

Here, "*" indicates the complex transpose of the matrix.

Here, $\omega_q$ to $\omega_r$ are the frequencies in which the frequency components to be reduced are included. The frequency of the high order resonance mode can be selected as one example thereof.

From these formulations as explained above, the two-degree-of-freedom control method of the present invention is concluded to find out the time allocation $T_1$ to $T_N$, by considering constrained non-linear optimization, which minimizes the evaluation function J in equation (17) under the constrained conditions in equation (15).

Hereinafter, one example of the specific application of the two-degree-of-freedom control system of the present invention, which is modified to the one track seek control system for controlling an actuator (a VCM: Voice Coil Motor) of a magnetic disk drive apparatus, will be described. The VCM is used for positioning a magnetic head. First of all, the overall structure of the magnetic disk drive apparatus will be explained with reference to FIG. 7.

Figure 7:
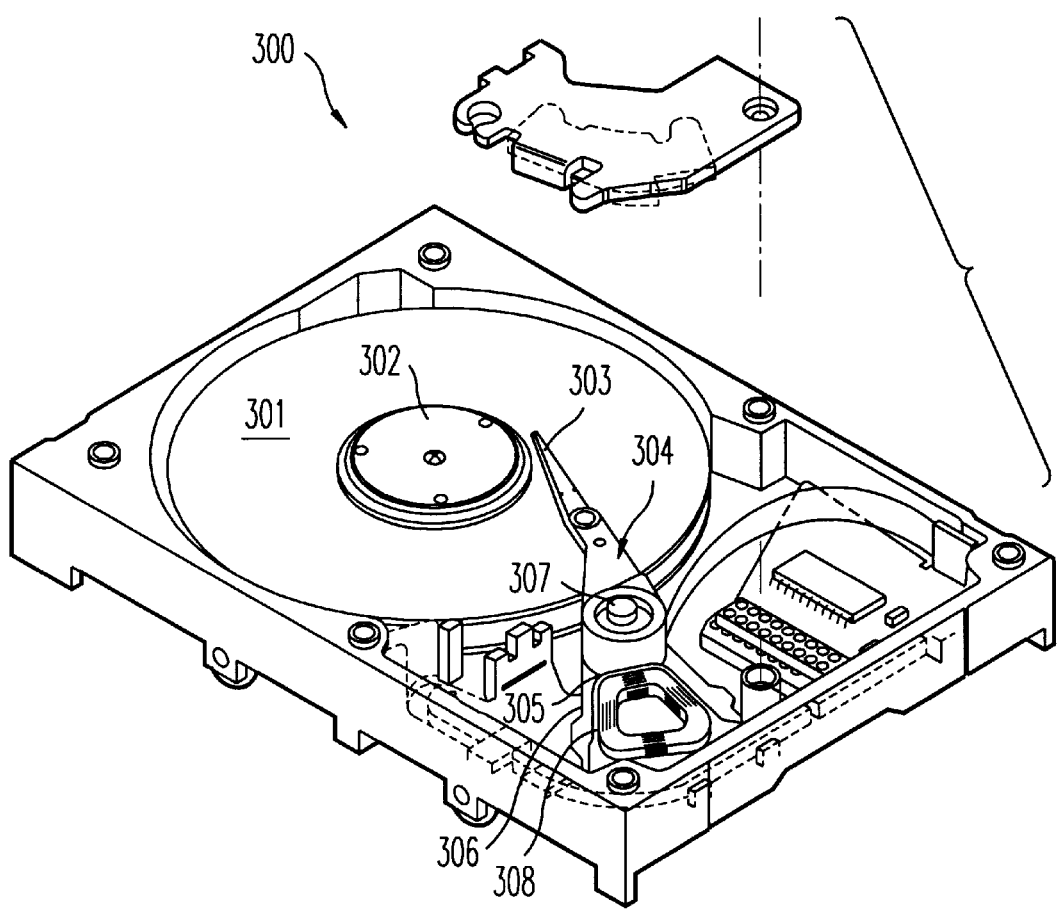
FIG. 7 is a perspective view showing the structure of a magnetic disk drive apparatus, capable of applying the two-degree-of-freedom control system of the present invention.

FIG. 7 is a perspective view showing the structure of the magnetic disk drive apparatus 300, which is capable of applying two-degree-of-freedom control system of the present invention. A magnetic disk 301 is secured on a spindle motor 302 and is rotated at a predetermined rotation rate. A magnetic head 303, which is equipped with a magnetic gap (not shown) for performing recording/reproducing of information while floating above or contacting the magnetic disk 301, is secured on the tip of a suspension 304 made of a thin metal plate. The suspension 304 is secured on one end of an actuater arm 305, and the VCM 306 is coupled to the other end thereof. The VCM 306 is constituted by a coil 308 for moving the VCM 306, a bobin for fixing the coil 308, and a magnetic circuit including a magnet and a yoke facing each other to oppose the coil 308. The actuator 305 is supported by two ball bearings (not shown) equipped on both sides of a shaft 307, and is capable of reciprocating around the shaft 307 by the VCM 306. It is possible to know more detail of the magnetic disk drive apparatus 300 by referring to U.S. Pat. No. 5,859,748.

Figure 8:
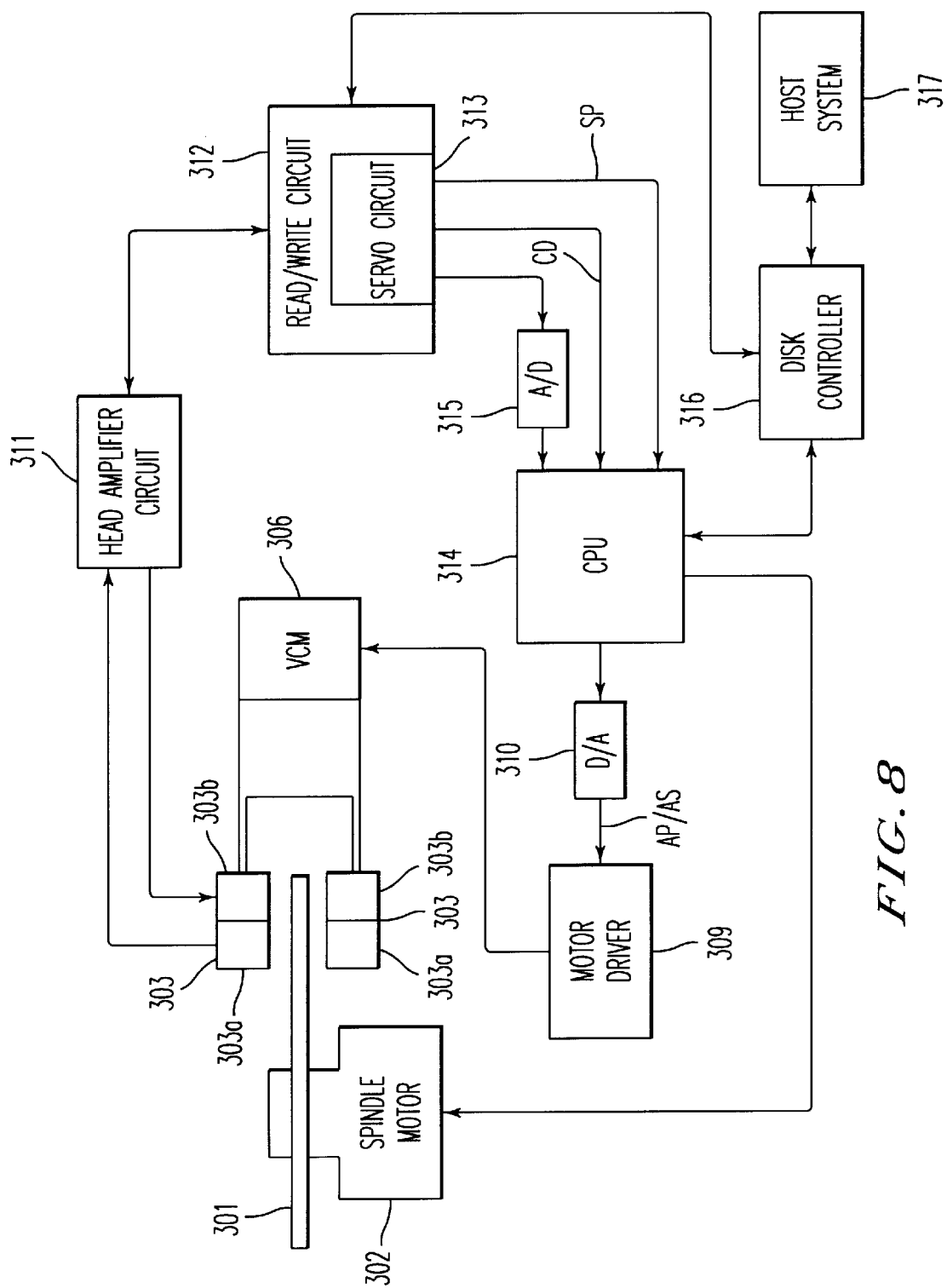
FIG. 8 is a block diagram showing a control system of a VCM (Voice Coil Motor) of the magnetic disk drive apparatus of the present invention.

Hereinafter, the method of the two-degree-of-freedom control system applied to the VCM 306 of the magnetic disk drive apparatus 300 will be described with reference to FIG. 8. The disk 301 has many tracks in concentric circular form, and each track has a plurality of servo areas to a circumferential direction continuously in a predetermined interval. The servo areas store pre-recorded servo data for seek control and position control of the VCM 306. The interval of each servo area is defined in accordance with the sampling frequency; 3.5 kHz for example, for improving the recording density. While FIG. 7 shows two disks 301, usually one to five disks can be employed in a magnetic disk drive apparatus.

The head 303 is preferably a separate read/write type head 303 in which a read head 303a as MR (Magneto-Resistive) head, and a write head 303b as inductive head are independently equipped. Each surface of the disk 301 faces the head 303.

The VCM 306 is driven by receiving drive current from a motor driver 309. The motor driver 309 converts control voltage output from a D/A converter 310 to the drive current, thereby supplying a coil 308 of VCM 306.

The magnetic disk drive apparatus 300 further includes a head amplifier circuit 311, a read/write circuit 312, a servo controller 313, CPU 314, a D/A converter 315, and a disk controller 316.

The head amplifier circuit 311 is a driver IC for the read head 303a and the write head 303b, and the head amplifier circuit 311 is equipped with a read amplifier for amplifying the read-signal read from the read head 303a and a write amplifier for supplying the recording current to the write head 303b.

The read/write circuit 312 is usually constituted by an exclusive integrated circuit as a signal processor. The read/write circuit 312 inputs the read-signal read from the read head 303a through the head amplifier circuit 311, and executes various of signal processing thereby decoding the original data. The read/write circuit 312 outputs the write-signal transmitted from the disk controller 316 and modulates the write-signal by using predetermined modulation method, RLL method (Run Length Limited method) for example, thereby outputting to the head amplifier circuit 311.

The disk controller 316 is used as an interface between the magnetic disk drive apparatus 300 and a host system 317, such as a computer, and controls transmission of read/write data and access commands (read/write commands) between them.

A servo system in this magnetic disk drive apparatus 300 is constituted by the CPU 314, the A/D converter 315, D/A converter 310 and the VCM 306. The servo circuit 313 extracts servo data, such as position information of the head 303, and generates a sector pulse SP, which corresponds to the interruption signal to the CPU 314 and is synchronized with the sampling frequency. The servo data mainly includes track address, such as a cylinder code, used as the seek control, and servo burst data used as the position detection in the range of tracking region of the head 303.

The A/D converter 315 digitizes the servo burst data extracted from the servo circuit 313 and then outputs the digital signal to the CPU 314. The CPU 314 calculates, based on the burst data, the position of the head 303 in the tracking region. The CPU 314 recognizes, based on the track address, the tracking position of the head 303 in operation.

The CPU 314 controls the position of the VCM 306, by executing the prepared exclusive program (to be explained later). The CPU 314 receives the access commands (the read/write commands) from the host system through the disk controller 316, thereby executing the seek control and position control of the present invention. The CPU 314 also outputs a control value (digital data) derived by the seek control and the position control to the D/A converter 310. The prepared exclusive program for executing the method of the present invention can be stored in the CPU 314 beforehand, or can be installed to the host system 317 to operate the CPU 314 by a recording medium such as a CD-ROM, a DVD (Digital Versatile Disk), a floppy disk or the like.

Figure 9A:
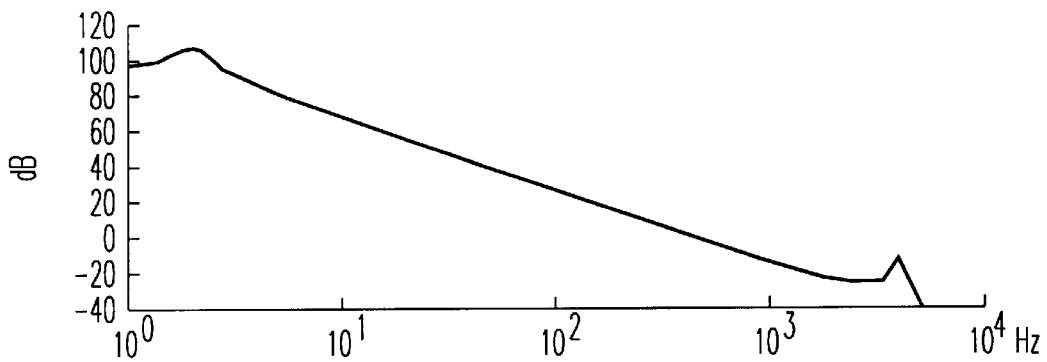
FIGS. 9A and 9B are simulated diagrams showing frequency characteristics of the VCM using a conventional control method.
Figure 9B:
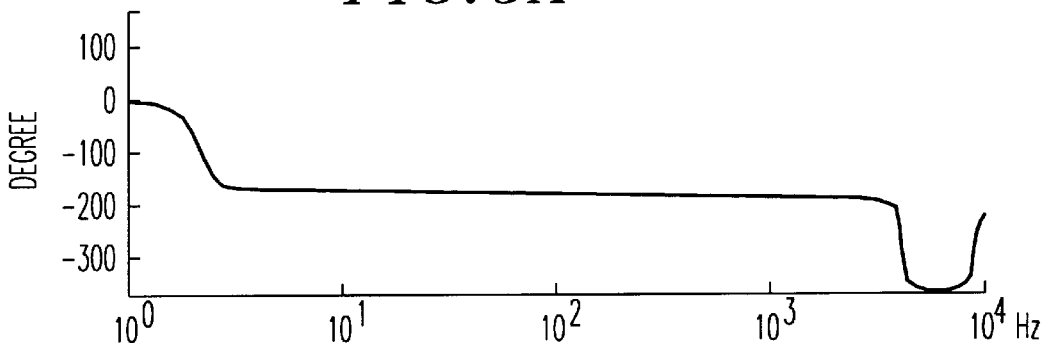
Figure 10A:
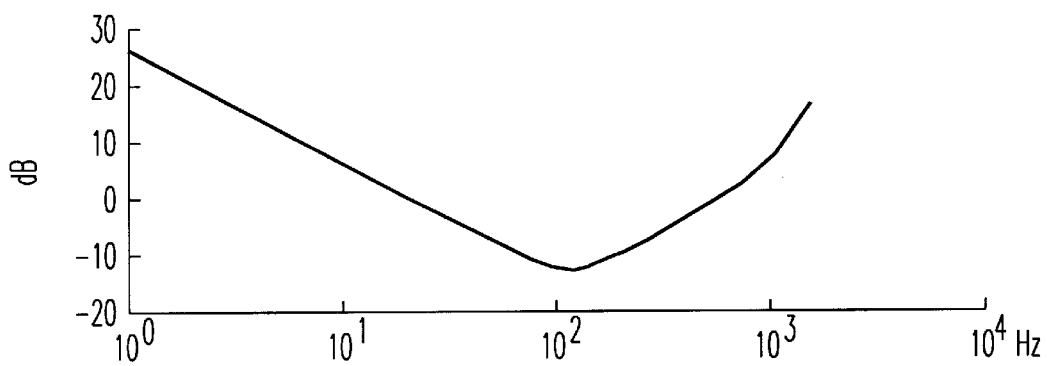
FIGS. 10A and 10B are simulated diagrams showing frequency characteristics of the feedback controller using a conventional control method.
Figure 10B:
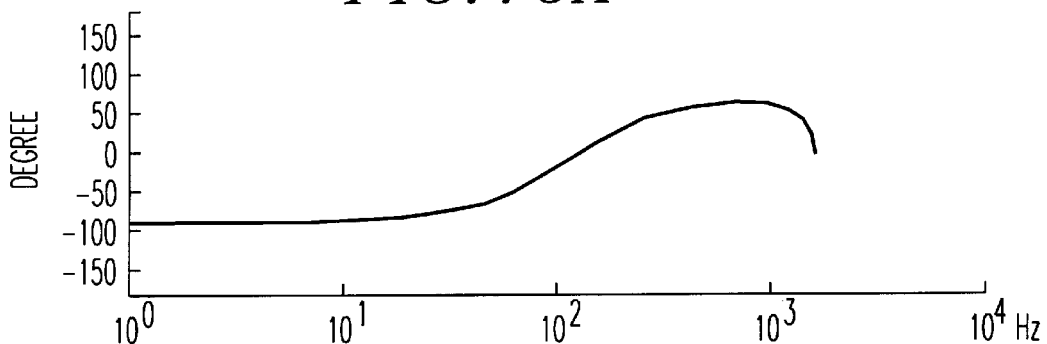

The simulated results in which the one track seek control system of the conventional method is applied to the magnetic disk drive apparatus are shown in FIGS. 9 and 10. FIGS. 9 and 10 are diagrams showing frequency characteristics of the VCM and the feedback controller. Here, the sampling frequency is set to 3.5 kHz, and the model of the VCM has its high order resonance mode around 4.0 kHz. In order to design the conventional two-degree-of-freedom control system, double integral is carried out to constitute the nominal model of the VCM as shown in FIG. 1, thereby realizing fast seek function which is capable of executing the one track seek control during four sampling periods.

Figure 11:
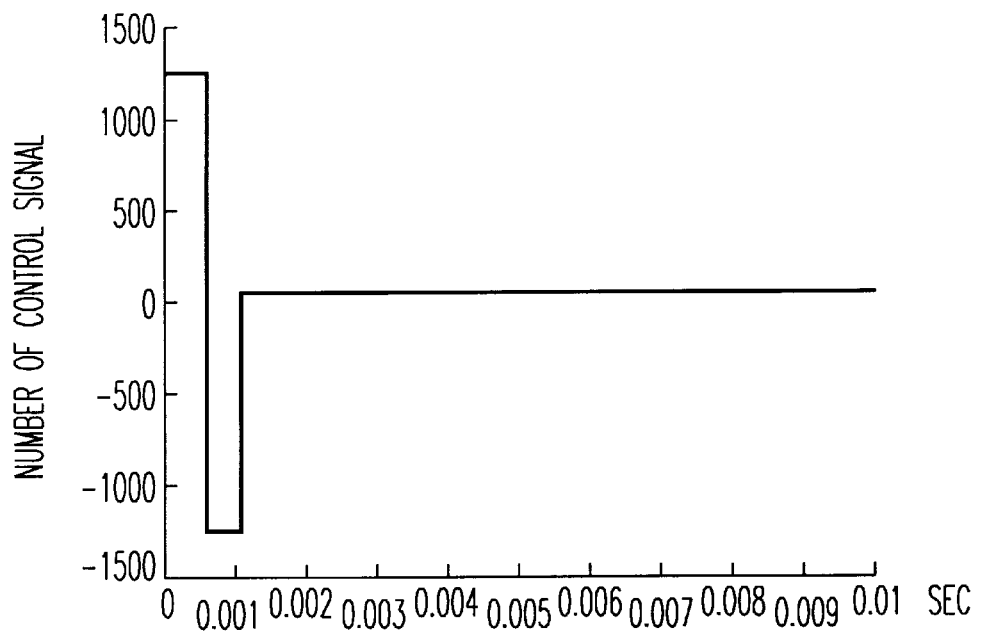
FIG. 11 is a diagram showing time progress verses the number of the control signal to be added to the VCM by the feedforward controller using conventional method.
Figure 12:
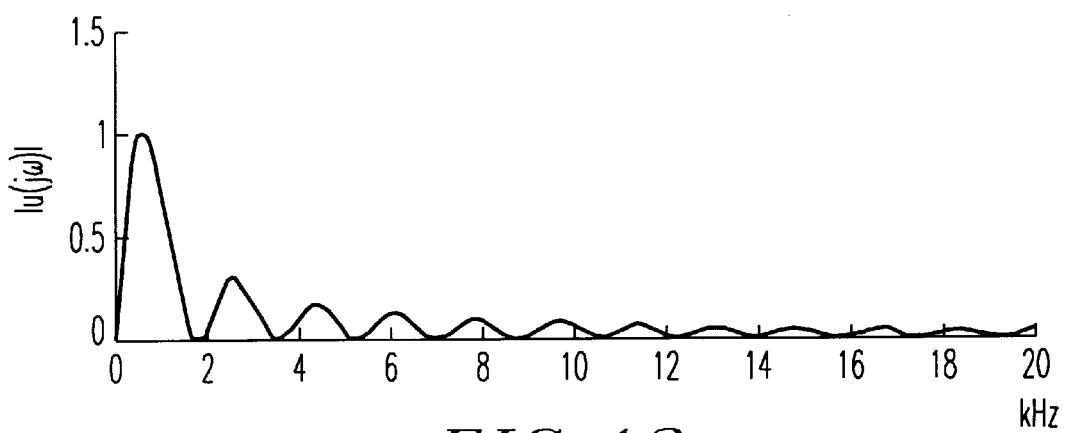
FIG. 12 is a diagram showing the frequency components of the control signal as shown in FIG. 11.
Figure 13A:
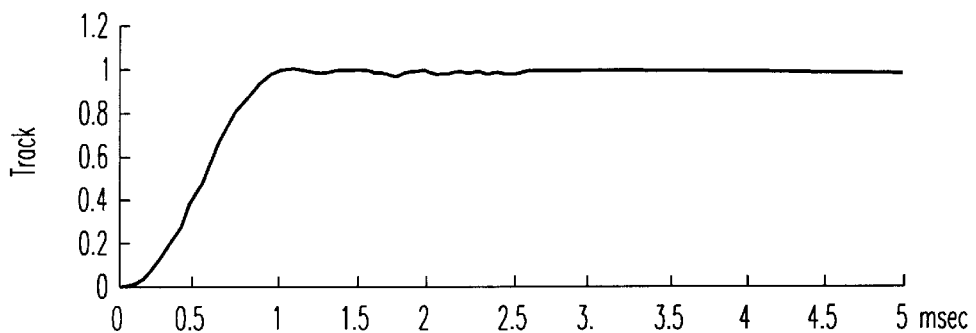
FIGS. 13A and 13B are simulated diagrams showing time progress of the position and the velocity of the VCM.
Figure 13B:
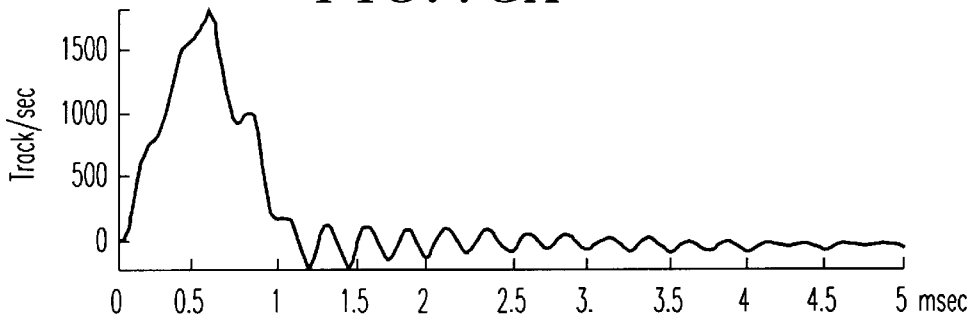
Figure 14A:
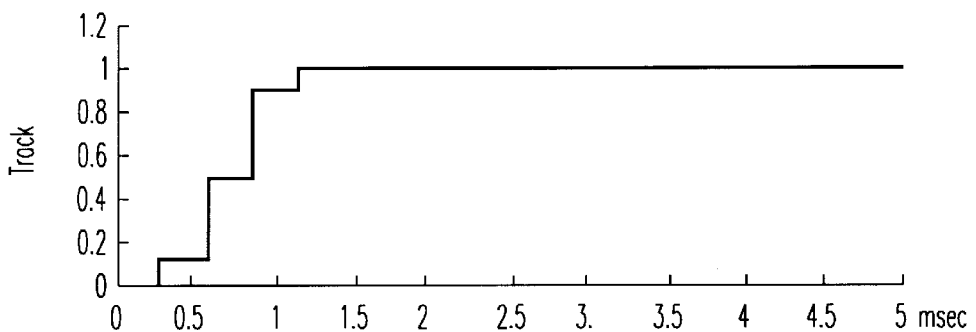
FIGS. 14A and 14B are simulated diagrams showing the position and the velocity on a sampling point of the VCM.
Figure 14B:
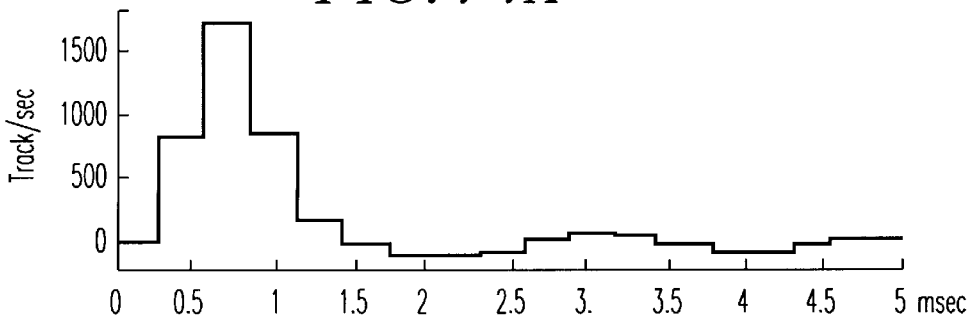

FIG. 11 is a diagram showing time progress verses the number of the control signal to be added to the VCM from the feedforward controller, and FIG. 12 is a diagram showing the frequency components of the feedforward controller. Further, both of FIGS. 13 and 14 are diagrams showing one example of time progress of the position and the velocity of the VCM.

As is obvious from these figures, in the conventional method, the control signal from the feedforward controller contains a lot of frequency components of the high order resonance mode of the VCM, due to difficulty of designing by considering the resonance mode whose frequencies are higher than the Nyquist frequency that corresponds to half of the sampling frequency and is approximately 1.75 kHz here. Therefore, vibrations can occur while fast seeking as shown in FIGS. 13 and 14.

Figure 15A:
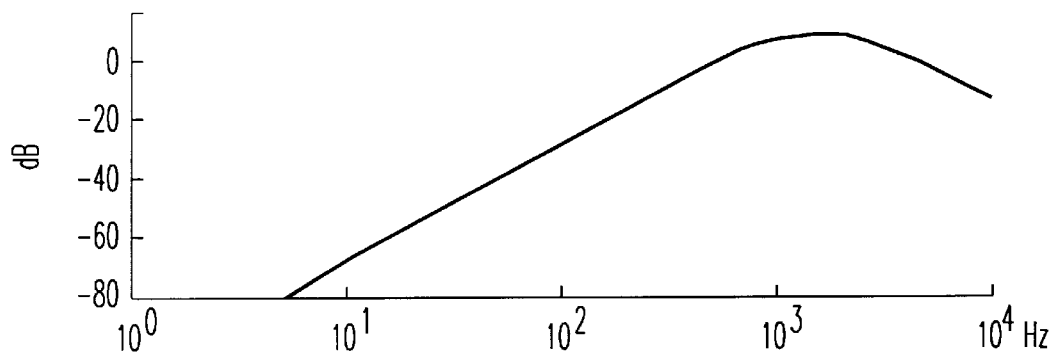
FIGS. 15A and 15B are simulated diagrams showing frequency characteristic of a feedforward controller in a continuous system of the present invention.
Figure 15B:
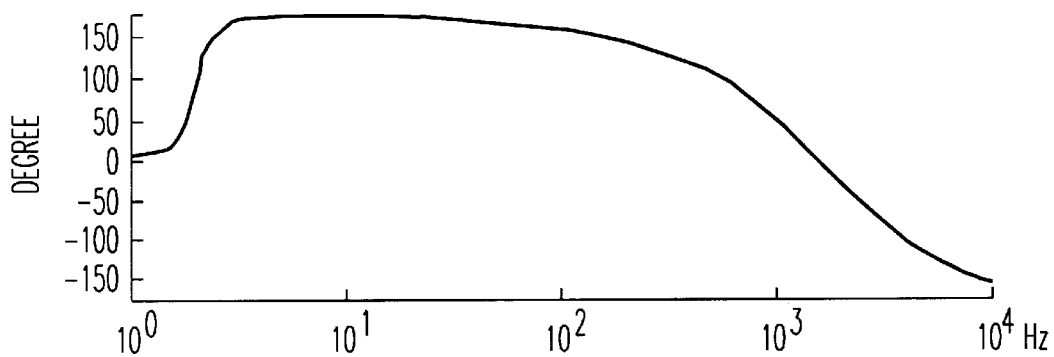
Figure 16:
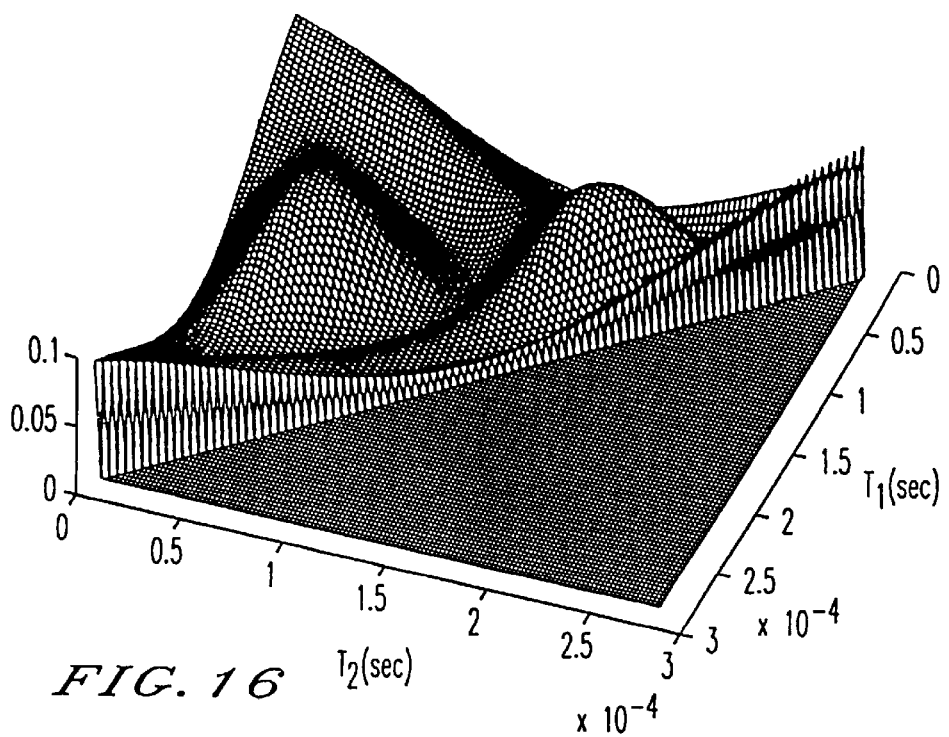
FIG. 16 is a three-dimensional contour diagram showing the evaluation function J against the time allocations $T_1$ and $T_2$ of the present invention.
Figure 17:
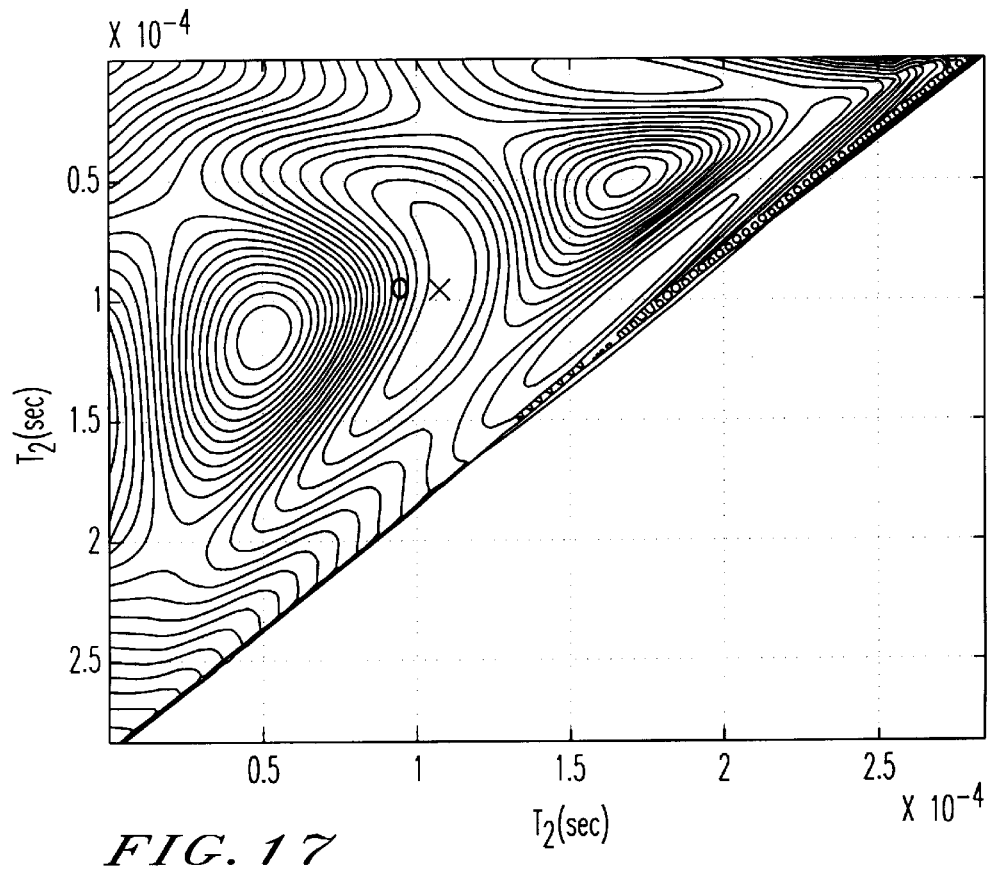
FIG. 17 is a diagram showing the relation between the time allocations $T_1$ and $T_2$ of FIG. 16.
Figure 18:
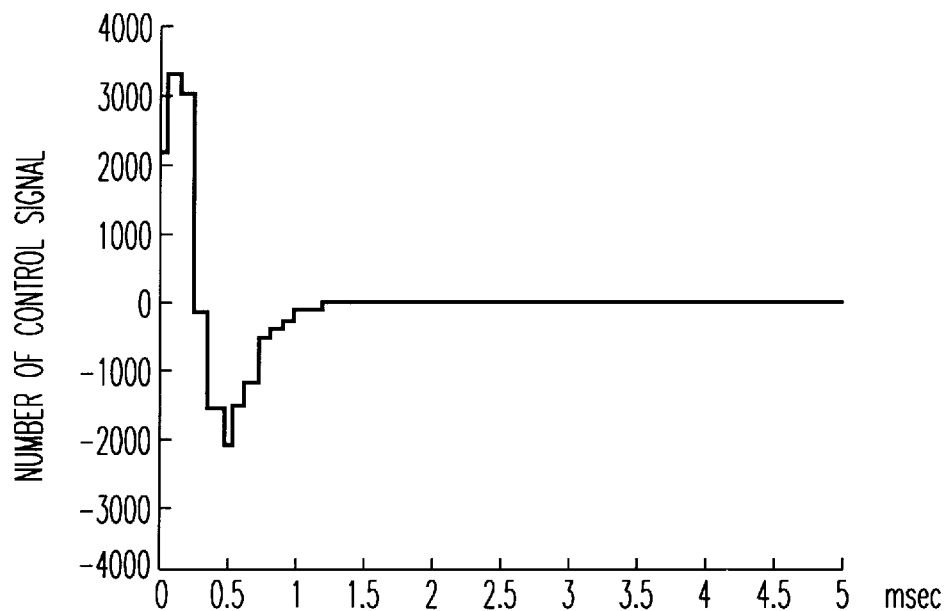
FIG. 18 is a diagram showing the time progress of the number of control signal to be added to the N-Delay feedforward controller of the present invention.
Figure 19:
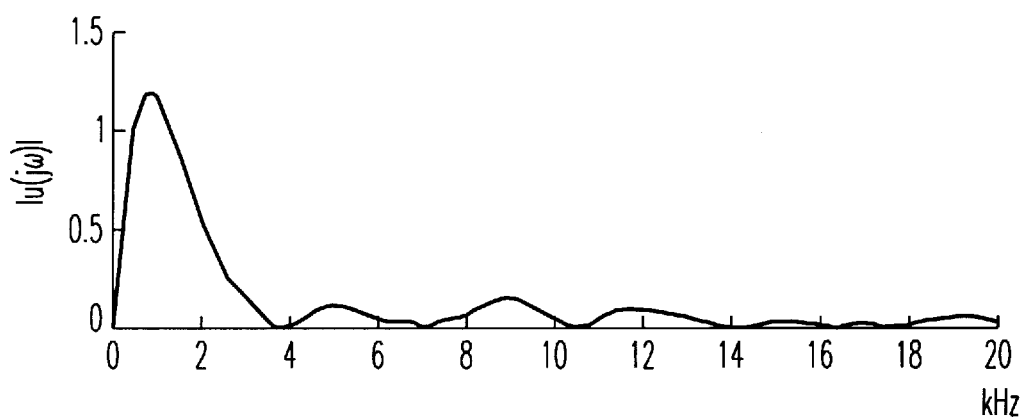
FIG. 19 is a diagram showing the frequency components of the N-Delay feedforward controller of FIG. 18.
Figure 20A:
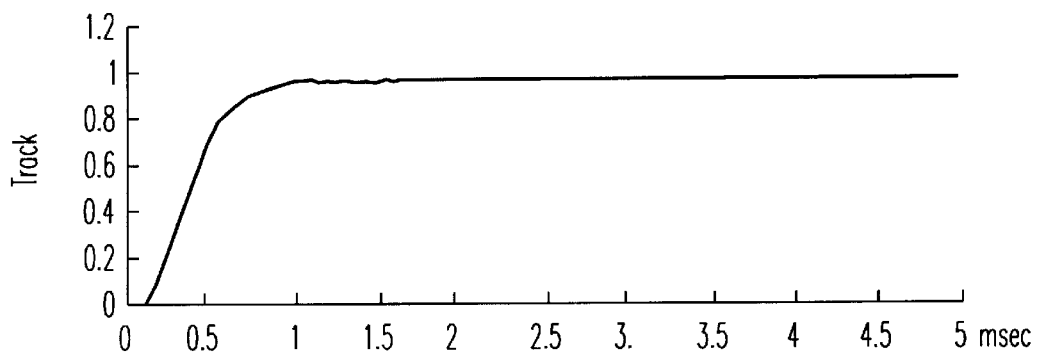
FIGS. 20A and 20B are simulated diagrams showing one example of the position and the velocity in the continuous time of the VCM, while adding the control signal of the present invention.
Figure 20B:
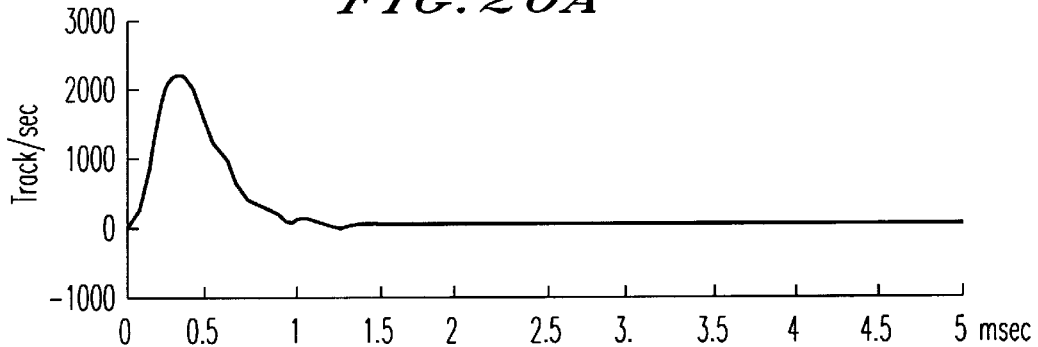
Figure 21A:
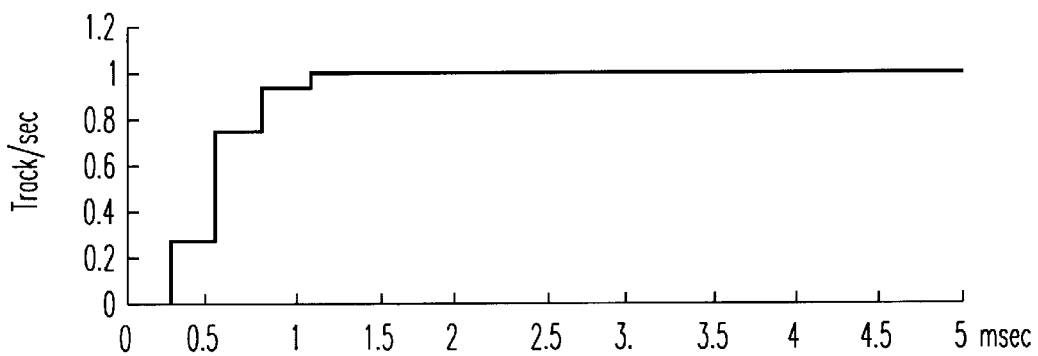
FIGS. 21A and 21B are simulated diagrams showing one example of the position and the velocity on the sampling point in the continuous time of the VCM, while adding the control signal of the present invention.
Figure 21B:
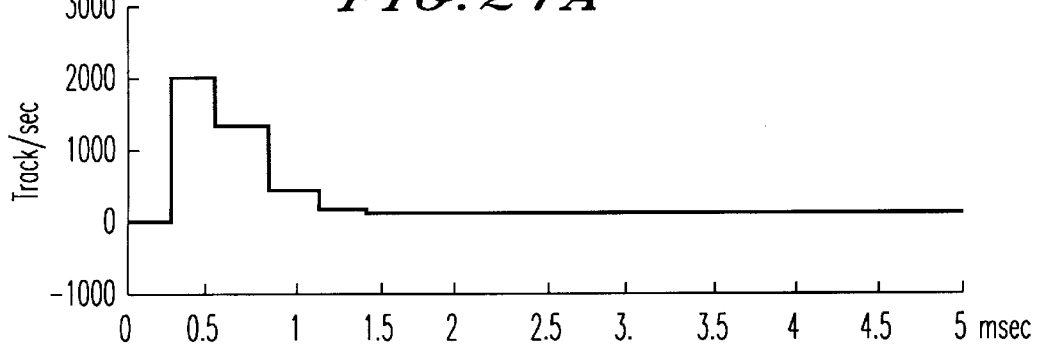

Next, the result of simulation of the one track seek control system of the present invention will be explained with reference to the frequency characteristic of the feedforward controller as shown in FIGS. 15A and 15B. Here, it is assumed that the time of changes in a sampling period is three, and the frequencies to be evaluated are 3.75 kHz, 4.0 kHz and 4.2 kHz by considering the variations of the high order resonance mode of the actuator. That is, these frequencies are set to be different values from the integer-fold of the Nyquist frequency. FIG. 16 is a perspective diagram showing the evaluation function J against the time allocations $T_1$ and $T_2$. Considering the evaluation function J to be the non-linear optimization question, the time allocations are found. The initial value of $T_1$ and $T_2$ is indicated as 'O' and the optimized value thereof is indicated as 'X' in FIG. 17. The results of simulation, using $T_1$ and $T_2$, to a model which is assumed to have the same resonance mode in 4.0 kHz, are shown in FIGS. 18 to 21. FIG. 18 is a diagram showing the number of control signal of the N-Delay feedforward controller, and FIG. 19 is a diagram showing the frequency components thereof. FIGS. 20 and 21 are diagrams showing one example of time progress verses the position and the velocity in the continuous time of the VCM while the control signal is added. It is understood from these figures that the control signal with less frequency components in the high order resonance mode are produced, and thereby realizing the seek control with high speed and less vibrations by using the present invention.

Figure 22A:
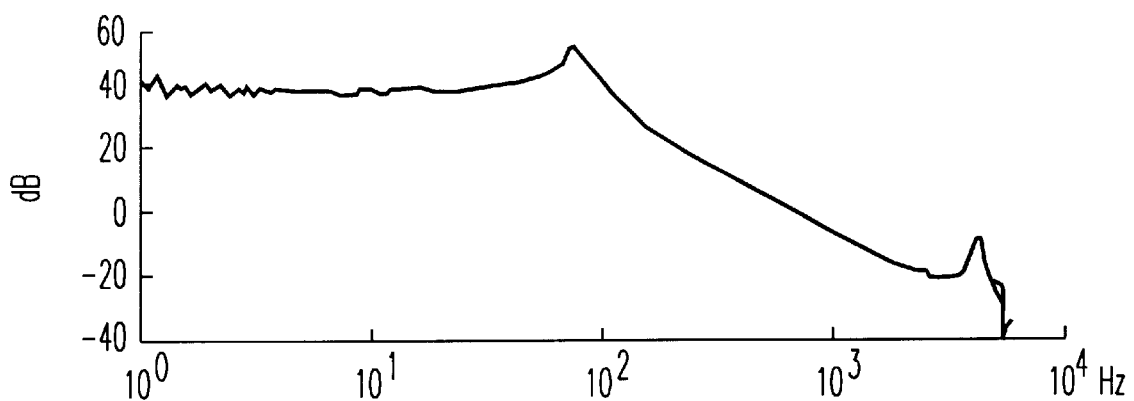
FIGS. 22A and 22B are simulated diagrams showing the frequency characteristics of the VCM of the magnetic disk drive apparatus of the present invention.
Figure 22B:
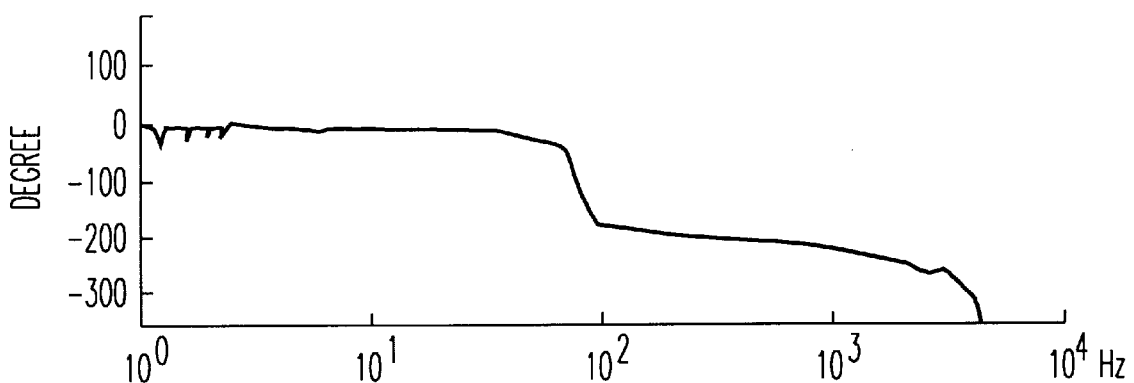

Experimental result of the one track seek control of the magnetic disk drive apparatus will be explained in order to explain the efficiency of the present invention. The magnetic disk drive apparatus as derived in the experiment has its sampling frequency in 3.5 kHz. The frequency characteristic of the VCM of this magnetic disk drive apparatus is shown in FIGS. 22A and 22B. The high order resonance mode of this VCM can be seen approximately around 4.2 kHz. The N-Delay feedforward controller, which is used in the simulation, is also used here, to realize the one track seek control. As it is impossible, by the structural reason, for the magnetic disk drive apparatus to obtain information between each sampling point, the control performance thereof are compared and evaluated by noise that comes out while seeking a track.

Figure 23:
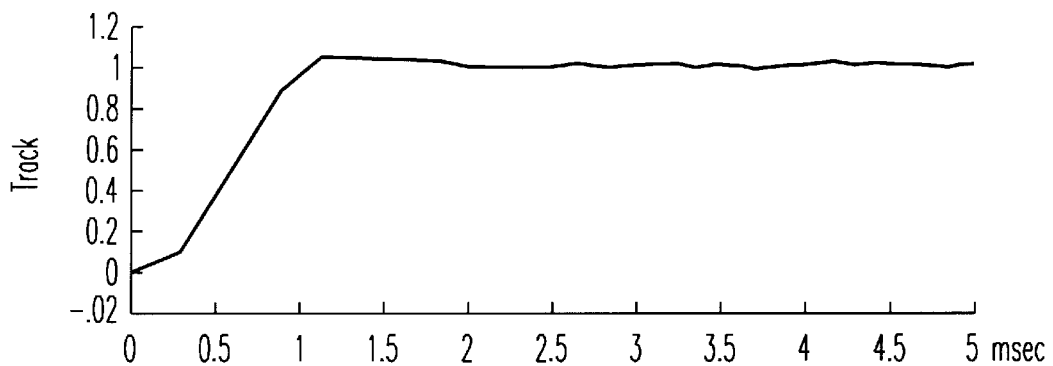
FIG. 23 is a diagram showing the measured position on the sampling point while seeking control of the conventional method.
Figure 24:
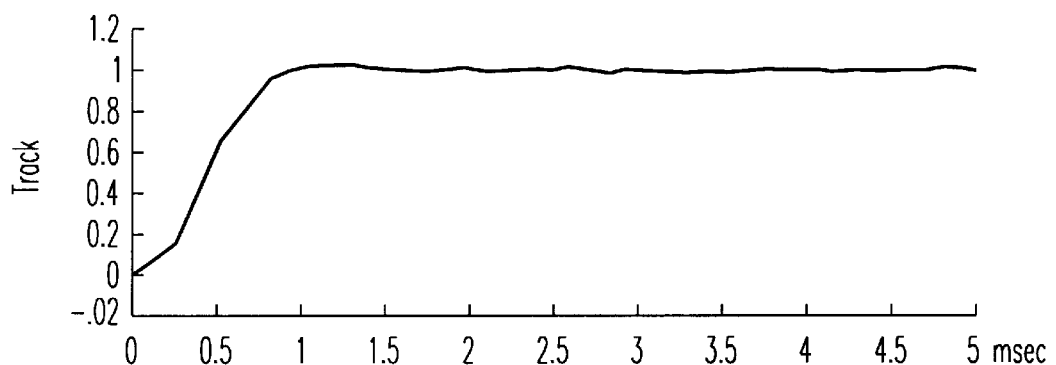
FIG. 24 is a diagram showing the measured position on the sampling point while seeking control of the present invention.
Figure 25:
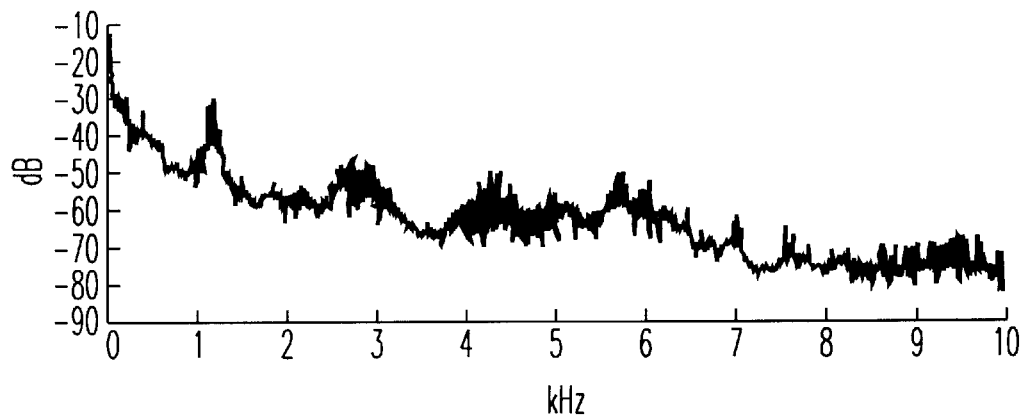
FIG. 25 is a diagram showing the measured noise while seeking control of the conventional method.
Figure 26:
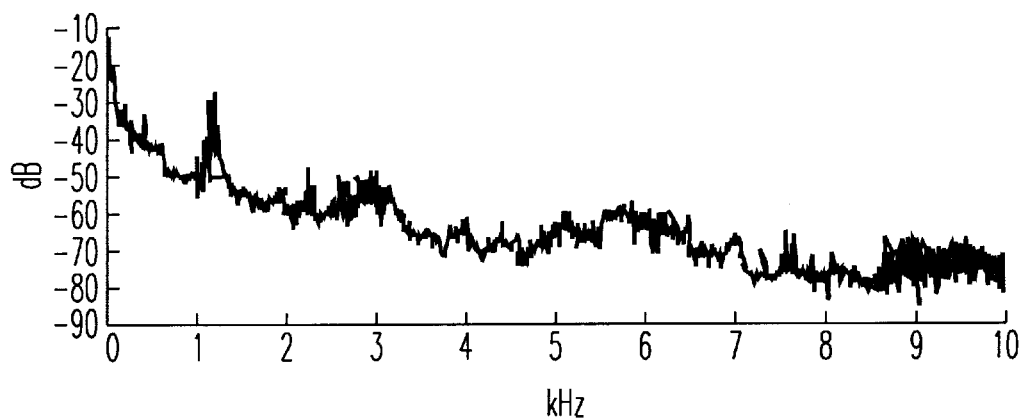
FIG. 26 is a diagram showing the measured noise while seeking control of the present invention.

The measured results of the position on the sampling point are shown in FIGS. 23 and 24, and the measured results of the noise are shown in FIGS. 25 and 26. Here, the position information is traced repeatedly twenty times, and the noise information is measured while the VCM is in the reciprocating motion. Concerning the response on the sampling point, although overshooting can be found in the conventional method as shown in FIG. 23, the result of the present invention as shown in FIG. 24 is deemed to be non-overshooting and similar to those of the simulation. Concerning the result of the noise, although the frequency components in the high order resonance mode of the VCM, which is approximately 4.0 kHz, can be found remarkably in the conventional method as shown in FIG. 25, it is obvious from FIG. 26 that the frequency components of the present invention are much less than that of the conventional method. From the results as explained above, N-Delay controller of the present invention has advantages of realizing faster seeking and less vibration than those of the conventional method.

The entire contents of Japanese Patent Application H10-147979, filed May 28, 1998, are incorporated herein by reference.

As described above, according to the present invention, the tracking control is realized, in which the high order resonance mode of the actuator is higher than the Nyquist frequency and the high order resonance mode is not excited even though it is close to the control band.

What is claimed is:

1. A method of controlling a two-degree-of-freedom control system for controlling a controlled object by a feedforward control and a feedback control, comprising the steps of:

generating a first signal for the feedforward control using a target value, said first signal having a plurality of signal components;

generating a second signal for the feedback control using an output signal from the controlled object;

outputting the plurality of signal components of the first signal while the second signal is outputted once, wherein the plurality of the signal components of the first signal respectively have different time widths that cumulatively correspond to a single sampling period of the second signal; and controlling the controlled object using the first signal and the second signal.

2. A method according to claim 1, further comprising the step of setting a frequency component of the first signal to be reduced, unless the frequency component corresponds to integer-fold of Nyquist frequency of the second signal.

3. A method according to claim 1, wherein the first signal and the second signal are digital signals.

4. A two-degree-of-freedom control system capable of controlling a controlled object by a feedforward control and a feedback control, comprising:

a first control system that generates a first signal for the feedforward control using a target value, said first signal having a plurality of signal components;

a second control system that generates a second signal for the feedback control using an output signal from the controlled object, the controlled object being controlled using the first signal and the second signal; and a controller that outputs the plurality of signal components of the first signal while the second signal is outputted once, wherein the plurality of the signal components of the first signal respectively have different time widths that cumulatively correspond to a single sampling period of the second signal.

5. A system according to claim 4, wherein a frequency component of the first signal is set to be reduced, unless the frequency component corresponds to integer-fold of Nyquist frequency of the second signal.

6. A system according to claim 4, wherein the first signal and the second signal are digital signals.

7. A method of controlling a magnetic disk drive apparatus for controlling an actuator for positioning a magnetic head by a feedforward control and a feedback control, comprising the steps of:

generating a first signal for the feedforward control of the actuator using a target value for the actuator, said first signal having a plurality of signal components;

generating a second signal for the feedback control of the actuator using an output signal from the actuator;

outputting the plurality of signal components of the first signal while the second signal is outputted once, wherein the plurality of the signal components of the first signal respectively have different time widths that cumulatively correspond to a single sampling period of the second signal; and controlling the actuator using the first signal and the second signal.

8. A method according to claim 7, further comprising the step of setting a frequency component of the first signal to be reduced, unless the frequency component corresponds to integer-fold of Nyquist frequency of the second signal.

9. A method according to claim 7, wherein the first signal and the second signal are digital signals.

* * * * *